United States Patent [19]

Citta et al.

[11] Patent Number: 4,885,776
[45] Date of Patent: Dec. 5, 1989

[54] TELEVISION SIGNAL ENCODER WITH REDUCED TRANSIENT SWITCHING EFFECTS

[75] Inventors: Richard W. Citta, Oak Park; Michael E. Long, Oak Brook; Dennis M. Mutzabaugh, Mount Prospect, all of Ill.

[73] Assignee: Zenith Electronics Corporation, Glenview, Ill.

[21] Appl. No.: 159,813

[22] Filed: Feb. 24, 1988

[51] Int. Cl.⁴ ............................................. H04N 1/44
[52] U.S. Cl. ...................................... 380/15; 380/12; 380/17
[58] Field of Search ............................. 380/12, 15, 17

[56] References Cited

U.S. PATENT DOCUMENTS

| | | | |
|---|---|---|---|
| 3,852,519 | 12/1974 | Court | 380/2 |
| 4,022,972 | 5/1977 | Pires | 380/17 |
| 4,034,402 | 7/1977 | Brian | 380/17 |
| 4,257,065 | 3/1981 | Papay | 380/17 |
| 4,467,353 | 8/1984 | Citta et al. | 380/12 |
| 4,594,609 | 6/1986 | Romao et al. | 380/15 |
| 4,682,224 | 7/1987 | Ragan et al. | 380/15 |
| 4,706,283 | 11/1987 | Citta et al. | 380/12 |
| 4,706,284 | 11/1987 | Citta et al. | 380/12 |
| 4,759,061 | 7/1988 | Citta et al. | 380/17 |

OTHER PUBLICATIONS

Communications Engineering and Design, RF/BTSC Interface, Dec. 18, 1985, by James O. Farmer.

*Primary Examiner*—Salvatore Cangialosi

[57] ABSTRACT

A television encoding system passes a modulated video carrier through a pair of SAW filters for attenuating and reversing the phase of the carrier during horizontal intervals. Another pair of SAW filters impart intermediate amplitude and phase changes to the video carrier during transitions into and out of the horizontal intervals to minimize switching transients and frequency disturbances in the color and audio carriers.

20 Claims, 2 Drawing Sheets

TELEVISION SIGNAL ENCODER WITH REDUCED TRANSIENT SWITCHING EFFECTS

This invention generally relates to techniques for reducing switching transients in encoding and decoding systems and particularly concerns techniques for reducing switching transients in television signal encoding and decoding systems.

BACKGROUND OF THE INVENTION

In subscription television systems, a television signal is typically transmitted, either "over-the-air" or through a suitable cable network, in a scrambled, that is, encoded form to render the video information largely unviewable when the signal is received and processed by a conventional television receiver. Authorized subscribers are provided with decoders that unscramble the scrambled signals to render them viewable on the television receiver.

A common signal scrambling technique is horizontal sync suppression, which causes erratic operation of the receiver deflection circuits and results in a scrambled display. In addition, sync suppression may adversely affect recovery of the color reference burst and cause inaccurate color reproduction.

The sync suppression system disclosed in U.S. Pat. No. 4,467,353 to Richard W. Citta and Ronald B. Lee provides reliable and secure television signal encoding and decoding. In this system, in addition to suppression of the horizontal sync components, the phase of the video signal carrier is reversed during the horizontal blanking interval. These phase reversals are detected in the decoder for enabling restoration of the horizontal blanking intervals and synchronization pulses to their proper levels.

U.S. Pat. No. 4,706,283, in the names of Richard W. Citta, Dennis M. Mutzabaugh and Gary J. Sgrignoli, incorporated herein by reference, discloses apparatus and methods using surface acoustic wave ("SAW") filters in a television scrambling system employing horizontal sync pulse suppression and carrier phase reversal. The stable frequency response and attenuation characteristics of SAW filters provide reliable signal phase shifting and attenuation during the horizontal blanking intervals. Similarly, the use of complementary SAW filters in the decoder provides for reliable restoration of the horizontal blanking intervals and syncs in the received signal.

The referenced systems encode the video signal by applying it to a pair of SAW filters having differing phase and amplitude attenuation characteristics. A timing pulse, developed from the baseband composite video signal, controls a switch, that in turn controls which of the pair of SAW filters is coupled to the output circuitry. The output circuitry includes a vestigial side band filter required in the NTSC system. The vestigial side band filter is non-linear and introduces non-linear attenuation and phase changes to the video carrier.

The decoder has a pair of SAW filters, which are complementary to the pair of SAW filters in the encoder. The decoder also includes a synchronous detector for generating timing pulses which operate a switch for selecting the outputs of the SAW filters in a manner so as to decode the received signal.

In this system, both the endcoding and decoding SAW filters are switched at a very rapid rate, typically on the order of 1 to 2 nanoseconds which represents a frequency that is much higher than the video carrier frequency. In the encoder, these high switching rates of the RF video signal result in the transmission of single-sideband transients due to the effect of the vestigial sideband filter. These transients can adversely affect the operation of the decoder as well as that of the television receiver connected to the output of the decoder.

In an effort to reduce switching transients, some prior art sync suppression systems reduce the amplitude of the picture carrier during switching times. In order to remain in the double-sideband region of the vestigial sidebannd filter, such amplitude reductions must be maintained over relatively long periods of time. This, however, introduces other problems particularly in television receiver circuits requiring a continuous video carrier, such as intercarrier sound circuits and synchronous detectors.

OBJECTS OF THE INVENTION

It is accordingly a principal object of the present invention to provide an improved technique for reducing switching transients in an RF signal encoding and decoding system.

It is another object of the present invention to provide an improved sync suppression scrambling method and system.

It is yet another object of the invention to reduce distortion in television images reproduced from scrambled television signals.

It is a further object of the invention to reduce transmitted transients in television signal RF encoding and decoding systems utilizing horizontal synchronization pulse suppression and carrier phase reversal.

BRIEF DESCRIPTION OF THE DRAWINGS

These and other objects and advantages of the invention will be apparent from the following description taken in conjunction with the drawings, in which.

DESCRIPTION OF THE PREFERRED EMBODIMENT OF THE INVENTION

Figure 1A:
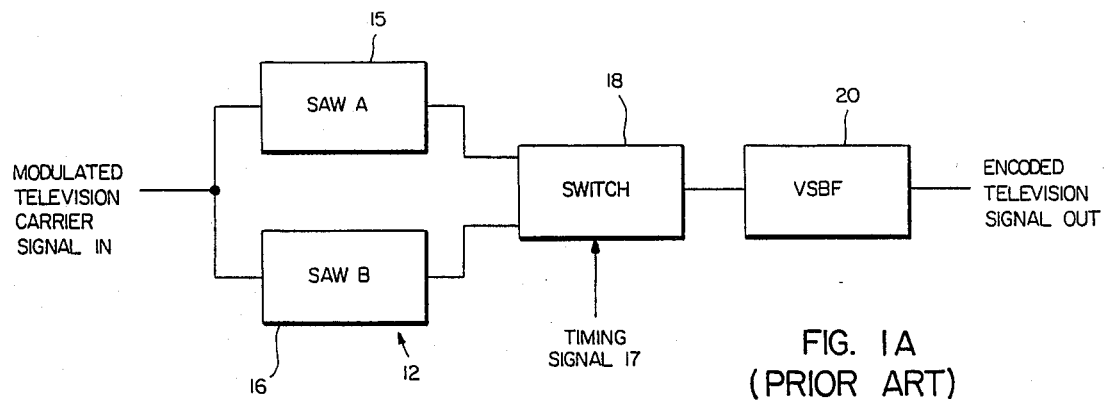
FIGS. 1A and 1B are block diagrams of a prior art television signal encoder and decoder, respectively.

Referring to FIG. 1A, an encoder 12 for scrambling and transmitting a scrambled television signal is shown. Encoder 12 includes a pair of SAW filters 15 and 16 of differing phase and attenuation characteristics. SAW 15 is labeled "SAW A" and SAW 16 is labeled "SAW B". The inputs of SAWs 15 and 16 are supplied with an amplitude modulated television carrier. The output of the SAWs are coupled to a switch 18 that is controlled by a timing signal 17 developed by a source (not shown) for selectively coupling the outputs of SAW 15 and SAW 16 to a vestigial sideband filter (VSBF) 20 that develops the encoded or scrambled television signal at its output. In particular, the output of SAW 15 is coupled to filter 20 during the active video portion of the video signal and the output of SAW 16 is coupled to filter 20 during the horizontal intervals of the video signal. SAW 15 transmits the modulated carrier signal without significant attenuation or phase shift whereas SAW 16 imparts a selected attenuation (e.g., approximately 6 or 10 db) and a 180 degree phase shift to the carrier signal. It will be appreciated that the attenuation and phase characteristics of the SAWs need not be exactly those described. The criteria is that the resultant signal should be effectively scrambled, yet the horizontal intervals capable of being restored reliably.

Figure 1B:
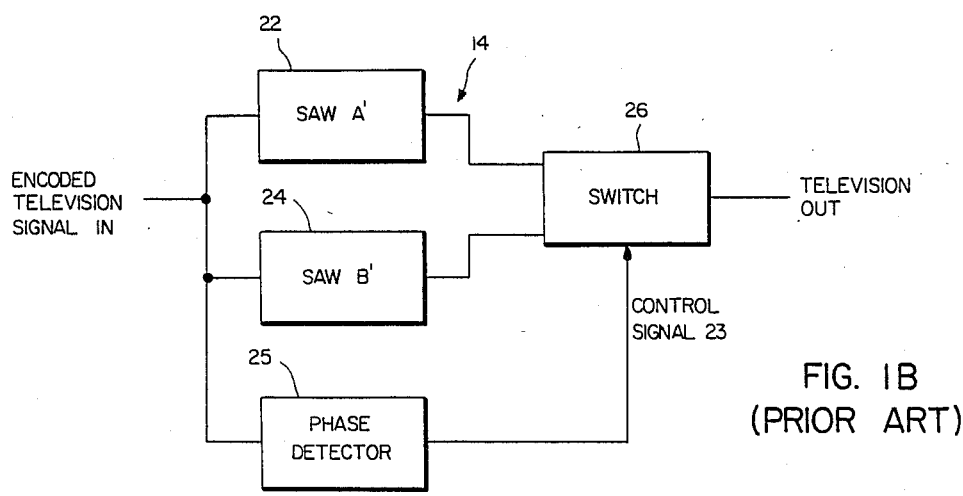

The prior art decoder in FIG. 1B includes a pair of SAW filters 22 and 24, respectively, that receive the encoded video signal. SAW 22 is indicated with an A' and SAW 24 with a B', representing that the characteristics imposed upon the signals passing therethrough are complementary to those imposed by the SAWs A and B. The outputs of SAWs 22 and 24 are coupled to a switch 26 which is controlled by a control signal 23 from a phase detector 25. The encoded video signal is supplied to phase detector 25 where it is detected and used to control operation of switch 26 for selecting the output of SAW 22 during the active video portions of the encoded video signal and the output of SAW 24 during the horizontal interval portions. The output of switch 26 therefore comprises a reconstituted, i.e., descrambled, RF video signal. As mentioned, the encoder and decoder arrangements of FIGS. 1A and 1B are in the prior art. It will further be recognized that more than two SAWs may be employed in the encoder for further scrambling of the signal with the additional SAWs imparting a differing attenuation and phase characteristic to the waves passed therethrough. Thus, for example, a SAW C having a characteristic different from SAW B could be alternated with SAW A for certain periods of transmission and SAWs A and B alternated during other periods of transmission.

Figure 2A:
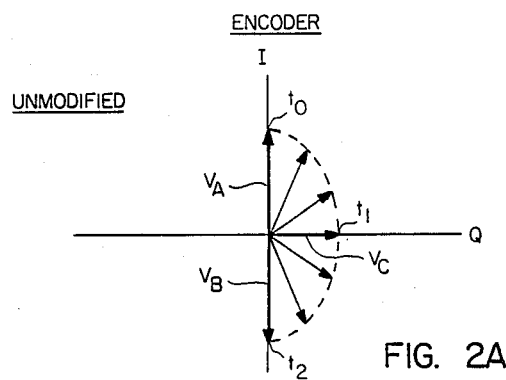
FIGS. 2A-2F are idealized locus diagrams of carrier phase and amplitude to help explain the theory of the invention.
Figure 2B:
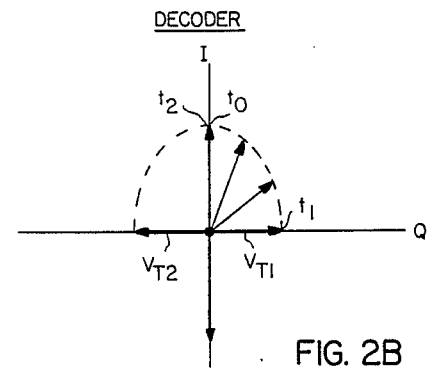

The locus diagrams of FIGS. 2A and 2B illustrate the phase and amplitude changes of the switching transient produced in the encoder and decoder of FIGS. 1A and 1B respectively in response to the switching of the SAWs described above. The encoder locus also takes into account the effect of VSBF 20. The locus diagrams are referenced to a vertical in-phase axis I and a horizontal quadrature axis Q. Referring to the encoder locus of FIG. 2A, the video carrier phase during active video is represented by vector $V_A$ lying on the in-phase axis I. Between times $t_0$ and $t_2$, corresponding to the transition of the video carrier from active video into a horizontal interval, the phase of the carrier is rapidly switched 180 degrees, the phase at time $t_2$ being represented by vector $V_B$. Due to the bandwidth restrictions imposed by VSBF 20 (about 4.2 MHz), the maximum switching speed ($t_0-t_2$) is limited to about 250–300 nanoseconds, during which time a significant switching transient is produced as shown. The vectors representing the switching transient occuring in the double-sideband region of VSBF 20 rotate in opposite directions so that their quadrature components cancel while their in-phase components together with the vector representing the single-sideband transient, follow the generally semi-circular locus of FIG. 2A. It will be seen that the vector defined by this locus rotates in a clockwise direction between times $t_0$ ($V_A$) and ($V_B$) and $t_2$, and is characterized by a relatively large component $V_c$ at time $t_1$ when the carrier crosses the quadrature axis Q.

In the decoder (FIG. 2B), the switching transient may be considered to comprise three components. Initially, the vector representing the phase of the received signal follows the clockwise rotation of the encoder vector between times $t_0$ and $t_1$ (the first component). At time $t_1$, the vector crosses the quadrature axis Q as represented by vector $V_{T1}$. The phase change of the carrier is detected substantially immediately thereafter by detector 25 as a projection along the negative portion of the in-phase axis I. Consequently, the output of decoder switch 26 is switched to SAW 24 resulting in a rapid 180 degree reversal of the carrier, represented by vector $V_{T2}$, a very large magnitude transient in the output signal (the second component). The third component of the decoder switching transient comprises the portion of the locus representing the clockwise rotation of the vector from $V_{T2}$ back to the in-phase axis I.

According to the present invention, the foregoing problems are reduced by forcing the encoder vector locus, and thereby the decoder locus, to assume a minimal amplitude at time $t_1$ as the phase vector approaches the quadrature axis Q (see FIGS. 2C–2F). As will be explained in further detail hereinafter, this is done by providing additional filters which subject the video carrier in the encoder to selected phase and amplitude characteristics just before and after switching. The result is a substantial modification of the encoder transient locus and substantial elimination of the second component of the decoder transient.

Figure 3:
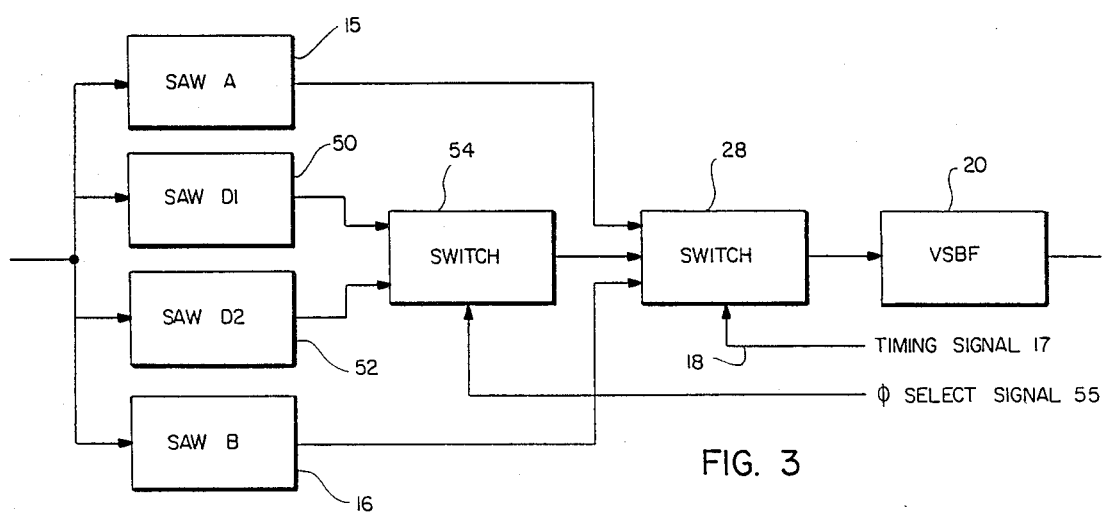
FIG. 3 is a block diagram of an encoder constructed in accordance with the invention.

Referring to FIG. 3, a pair of additional SAWs 50 and 52, indicated as D1 and D2, are coupled between the video carrier and another switch 54. Switch 54 supplies an output to switch 28, which supplies vestigial sideband filter 20. The additional SAWs 50 and 52 are utilized to provide a predictable, controlled transient between times $t_0$ and $t_2$ when the carrier is switched between SAWs A and B as well as between the times when the carrier is switched back from SAW B to SAW A. With the invention, SAWs 15 and 16 are utilized for the active video and horizontal interval portions, respectively, but SAW 50 is used when going from active video to a horizontal interval and SAW 52 is used when going from the horizontal interval back to active video. These time periods are preferably about 100–300 nanoseconds. The amplitude and phase shift characteristics of SAW 50 are substantially complementary to that of vector $V_c$ (FIG. 2A) whereas the characteristics of SAW 52 are 180 degree opposite that of SAW 50. A phase selecting signal 55 alternates between SAWs 50 and 52 and produces the proper signal to switch 28. Phase select signal 55 is produced in synchronism with timing signal 17.

Figure 2C:
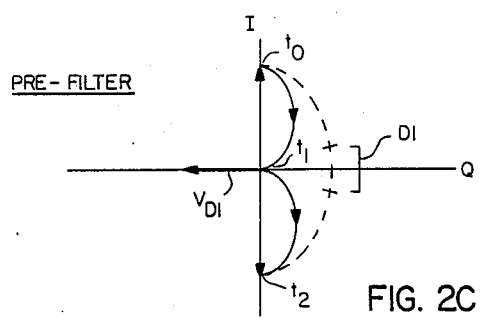
Figure 2D:
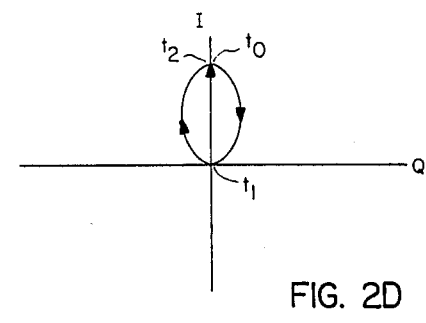
Figure 2E:
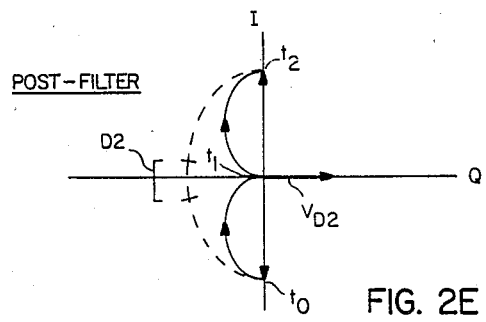
Figure 2F:
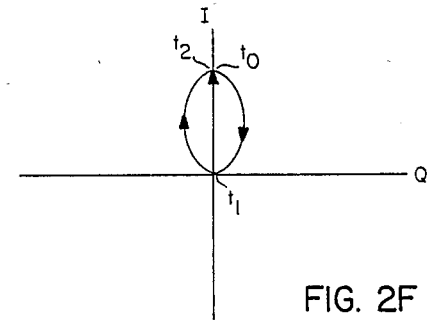

The amplitude and phase characteristics of SAWs 50 and 52 are represented by vectors $V_{D1}$ and $V_{D2}$ in the locus diagrams of FIGS. 2C and 2E respectively. Referring to FIG. 2C, it will be seen that the response vector $V_{D1}$ of filter 50 forces the phase of the video carrier to assume substantially zero amplitude for a relative short time interval as the locus approaches the quadrature axis thereby modifying the transmitted switching transient. Also, as illustrated in the corresponding decoder phase locus of FIG. 2D, the large second component of the decoder transient has been substantially eliminated. The operation and effect of SAW 52 is similar to that of SAW 50 as illustrated in the encoder and decoder phase locus diagrams of FIGS. 2E and 2F respectively.

The effect of SAWs 50 and 52 can be somewhat tailored to achieve the desired results. In particular, the magnitude of response vector $V_{D1}$ can be adjusted relative to its active time duration D1 to achieve a particular encoder phase locus. Thus, a relatively large magnitude response vector $V_{D1}$ can be employed over a short interval D1 or a relatively small magnitude response vector can be employed over a long interval D1. The magnitude of response vector $V_{D2}$ and corresponding time duration D2 can similarly be adjusted.

What has been described is a novel technique for reducing switching transients in a signal encoding and decoding system. While the technique has been described in relation to a television signal scrambling system utilizing suppressed horizontal intervals and carrier phase reversal, it will be understood that the principles of the invention are applicable to other systems, e.g. television signal scrambling systems whose horizontal syncs are suppressed without an accompanying reversal of the carrier signal phase. It is recognized that numerous changes in the described embodiment of the invention will be apparent to those skilled in the art without departing from its true spirit and scope. The invention is to be limited only as defined in the claims.

What is claimed is:

1. In a method of encoding an RF signal by subjecting the RF signal to a first response characteristic during a first time interval and a second response characteristic during a second time interval, the improvement comprising the steps of:
    subjecting the RF signal to a third response characteristic during a transition from said first time interval to said second time interval; and
    subjecting the RF signal to a fourth response characteristic during a transition from said second time interval to said first time interval.

2. The method of claim 1 wherein said thrid and said fourth response characteristics are substantially complementary to each other.

3. The method of claim 2 wherein said third and fourth response characteristics are selected for producing substantially zero magnitude transient component along the quadrature axis of said signal during transisions between said first and second intervals.

4. The method of claim 3 wherein said response characteristics are produced with SAW filters.

5. A method of encoding a television signal including a modulated video carrier having active video intervals separated by suppressed horizontal intervals and transmitted through a VSBF comprising the steps of:
    subjecting the video carrier to a first selected phase characteristic during a transition from an active video interval to a suppressed horizontal interval; and
    subjecting the video carrier to a second selected phase characteristic during a transition from a suppressed horizontal interval to an active video interval.

6. The method of claim 5 including the step of decoding said transmitted signal and wherein said first and second phase characteristics are selected such that a selected component of the switching transient produced during said decoding step is characterized by a substantially zero-value magnitude.

7. The method of claim 5 wherein said first and second phase characteristics are substantially complementary to each other.

8. The method of claim 5 wherein said first and second phase characteristics are selected for producing a substantially zero magnitude transient component along the quadrature axis of said video carrier during said transitions.

9. The method of claim 5 wherein said first and second phase characteristics are substantially complementary to the respective transient components of said VSBF along the quadrature axis of said video carrier during said transitions.

10. The method of claim 9 wherein said phase characteristics are produced with SAW filters.

11. A method of encoding a television signal having a video carrier modulated with active video intervals, interspersed with horizontal intervals and transmitted by a VSBF comprising the steps of:
    passing the active video portion of the video carrier through a first filter having a first amplitude and phase characteristic:
    passing the horizontal intervals of the video carrier through a second filter having a second amplitude and phase characteristic;
    passing the video carrier through a third filter having a third phase and amplitude characteristic between transitions from said active video to said horizontal intervals; and
    passing the video carrier through a fourth filter having a fourth amplitude and phase characteristic between transitions from said horizontal to said active video intervals.

12. The method of claim 10 including the step of decoding said transmitted signal and wherein said third and fourth filters have amplitude and phase characteristics selected such that a selected component of the switching transient produced during said decoding step is characterized by a substantially zero-value magnitude.

13. The method of claim 11 wherein said first filter imparts substantially no amplitude change to said video carrier, said second filter imparts a substantial amplitude reduction and 180 degree phase change to said video carrier; and
    said third and fourth filters impart phase and amplitude changes to said video carrier for producing substantially zero magnitude transient components along the quadrature axis of the video carrier during transients between said active video and horizontal intervals.

14. The method of claim 11 wherein said third and fourth filters impart phase and amplitude characteristics to the video carrier which are substantially complementary to the response transient component of said VSBF along the quadrature axis of the video carrier during transitions from said active video to said horizontal intervals.

15. A television signal encoder for encoding an amplitude modulated video carrier having active video intervals separated by horizontal intervals for transmission by a VSBF comprising:
    first means for subjecting the video carrier to a first amplitude and phase characteristic during transitions from said active video intervals to said horizontal intervals;
    second means for subjecting the video carrier to a second amplitude and phase characteristic during said horizontal intervals;
    third means for subjecting the video carrier to a third phase and amplitude characteristic during transitions from said horizontal intervals to said active video intervals; and
    switching means for sequentially switching said first, said second and said third means to a common output.

16. The apparatus of claim 15 wherein said first, second and third means comprise filters.

17. The apparatus of claim 16 including decoding means for decoding said transmitted signal, said filter means having characteristics selected for causing a selected component of the switching transient produced by said decoding means to assume a substantially zero-value magnitude.

18. The apparatus of claim 16 wherein said second characteristic is selected for producing a substantially zero magnitude transient component along the quadrature axis of said video carrier during transitions from said active video to said horizontal intervals.

19. The apparatus of claim 18 wherein said second characteristic is substantially complementary to the transient component of said VSBF along the quadrature axis of said video carrier during transitions from said active video to said horizontal intervals.

20. The apparatus of claim 19 wherein said second and third characteristics are substantially complementary.

* * * * *